United States Patent [19]

Saito et al.

[11] Patent Number: 5,001,590
[45] Date of Patent: Mar. 19, 1991

[54] MAGNETIC HEAD HAVING CORE HALVES WITH A BARRIER LAYER THEREBETWEEN

[75] Inventors: Kazuhiro Saito; Hideo Aoki; Osamu Murata, all of Toda, Japan

[73] Assignee: Nippon Mining Company, Limited, Tokyo, Japan

[21] Appl. No.: 388,199

[22] Filed: Aug. 1, 1989

[30] Foreign Application Priority Data

Aug. 23, 1988 [JP] Japan ................................ 63-209267

[51] Int. Cl.$^5$ ............................................. G11B 5/235
[52] U.S. Cl. ....................................... 360/120; 360/126
[58] Field of Search ................ 360/120, 119, 121, 122, 360/126, 127

[56] References Cited

U.S. PATENT DOCUMENTS 4,887,177 12/1989 Sillen .................................... 360/120

FOREIGN PATENT DOCUMENTS 61-16002 1/1986 Japan .................................... 360/120

Primary Examiner—A. J. Heinz
Attorney, Agent, or Firm—Seidel, Gonda, Lavorgna & Monaco

[57] ABSTRACT

A magnetic head with a pair of mated core halves, the mating surfaces of the core halves being bonded with a predetermined gap length provided therebetween. The magnetic head has a gap portion where, on each of the mating surfaces of the core halves, a non-magnetic dielectric layer of $SiO_2$ which is adjacent to the core half, a barrier layer, and a bonding glass layer are successively formed. The glass layers each associated with the corresponding core half are fusion pressure bonded together in such a manner as to form the gap portion.

6 Claims, 2 Drawing Sheets

MAGNETIC HEAD HAVING CORE HALVES WITH A BARRIER LAYER THEREBETWEEN

BACKGROUND OF THE INVENTION

1. Field of the Invention

The present invention relates in general to a magnetic head formed by bonding together a pair of core halves with a predetermined gap length provided therebetween. In particular, the present invention may be applied to a magnetic head in which magnetic film of an Fe-Si-Al alloy is employed and which is suitable for use as a high-density recording head applicable to the use of high frequencies and capable of meeting the requirement for a high S/N ratio, mainly as, e.g., a video head or a computer head.

2. Description of the Related Art

In the field of magnetic recording techniques, there have recently been remarkable improvements in the recording density achievable. In step with this, in the case of, for instance, magnetic heads which act as electromagnetic transducers, it is increasingly required that the width of the tracks be reduced, that the level of saturation magnetization of the core material be elevated, and that the magnetic permeability in high-frequency zones be enhanced.

In recent years, magnetic heads of certain types are receiving expeditious attention as being capable of meeting the above-mentioned requirements in the field of magnetic recording. These types include thin-film laminated magnetic heads in which magnetic film of an Fe-Si-Al alloy is employed. An example of a magnetic head of this type is shown in FIGS. 2 to 4. Referring to these figures, the structure of the magnetic head will be briefly described.

Referring to FIG. 3, a substrate 11 of the magnetic head is formed of crystallized glass or a ceramic material. A thin film 12 of an Fe-Si-Al alloy is formed on the surface of the substrate 11 with a film thickness of 1 to 20 $\mu$m. Subsequently, a non-magnetic dielectric film, or an interlayer film 13 which is formed of $SiO_2$ is formed on the magnetic alloy film 12 with a film thickness of 0.03 to 0.5 $\mu$m.

Further, the operation of laminating a magnetic film 12 and a non-magnetic dielectric film 13 is repeated a required number of times so as to form a magnetic-film structure body 14. The thickness of the magnetic films 12 and the non-magnetic dielectric films 13 as well as the number of the laminating operations are suitably set in such a manner that the thickness of the portion where they are laminated is equal to track width w (see FIG. 3).

Subsequently, a glass film 15 is formed on the magnetic-film structure body 14, then another substrate 16 is laminated on the glass film 15. Bonding glass is used as the glass film 15. The substrate 16 is formed using the same material as the substrate 11.

A laminated film structure body 17 prepared in this way, is then cut in the thicknesswise direction in which the body 17 is laminated, thereby forming a pair of core half blocks 18 and 19, as shown in FIG. 2. At least one of the core halves, the core half 18 in the illustrated example, is formed with a coil groove 20.

Subsequently, in order to achieve a firm bond between the mating surfaces of the core halves 18 and 19, chamfered portions 22 have hitherto been formed in the surface opposite to the coil groove 20, i.e., in the two lateral side surfaces of the core half 19 in this example, as shown in FIG. 2. Further, those portions of the core halves 18 and 19 which are on the side remote from the coil groove 20, are formed with recesses 23. Thereafter, the mating surfaces of the core halves 18 and 19 are subjected to polishing works. Then, a gap portion 21 is formed.

Thereafter, the core halves 18 and 19 are mated, with their mating surfaces facing each other. Molded glass is charged into the chamfered portions and the recesses, thereby joining the core half blocks.

Finally, R (radius) polishing works and other forming works are performed to form the tape sliding surface, and coil winding is also performed, thereby obtaining a magnetic head 10.

With the magnetic head 10 having the above-described construction, it is very important to finish the gap portion 21 formed on the mating surfaces of the pair of core halves 18 and 19 in such a manner that the portion 21 has predetermined dimensions and a predetermined configuration. If the finished gap portion suffers from any edge sagging, collapse, or spreading, this may cause great deterioration in the characteristics of the magnetic head.

As shown in FIG. 5, the gap portion has conventionally been formed by forming non-magnetic dielectric layers 25 and 26 of $SiO_2$ on the gap portion forming surfaces of the core halves 18 and 19, forming bonding glass layers 27 and 28 on the corresponding layers 25 and 26, bringing the bonding glass layers 27 and 28 associated with the corresponding core halves 18 and 19 into mutually facing relation, and fusion bonding the facing glass layers 27 and 28.

The magnetic head having the above-described arrangement possesses very good magnetic characteristics. However, in the manufacture of magnetic heads of this type, the gap portions 21 have to be formed in greatly varying yields. Sometimes, a high yield on the order of 70% may be continuously achieved. At other times, the yield may be as low as 0% or thereabouts if, for instance, the gap portion suffers from improper fusion bonding, and such low yields may continue. Repetition of these conditions may result in a yield of only about 5% per month in the worst case. Thus, the efficiency of manufacture has been very low.

SUMMARY OF THE INVENTION

The present inventors observed in detail those parts of a gap portion which are not fusion bonded. As a result, we found that bonding glass layers 27 and 28 which are associated with the corresponding mating surfaces of the core halves and which should be bonded together are only partially fused after being subjected to fusion bonding, and that, in an extreme case, the bonding glass layers do not seem to be fused at all.

The present inventors then conducted various studies and experiments in order to clarify the cause of the phenomenon we had observed. As a result, it was found that the cause of the possible failure of the bonding glass layers 27 and 28 associated with the core halves to be fusion bonded resides in the fact that, as temperature rises during fusion bonding, part of the $SiO_2$ contained in the associated non-magnetic dielectric layers 25 and 26 formed of $SiO_2$ diffuses into the bonding glass layers 27 and 28. The diffusion of $SiO_2$ into the bonding glass layers 27 and 28 causes an increase in the proportion of $SiO_2$ in these glass layers, which in turn causes an irregular change or increase in the softening point of the glass. As a result, the bonding glass layers fail to fuse at an ordinary fusion bonding temperature of 500° to 600° C.

In brief, it has been found that with magnetic heads having the conventional arrangement, the fusion bonding of the mating surfaces is effected in a condition determined by a delicate balance between the elevated temperature during fusion bonding, the diffusion speed of SiO$_2$ into the glass layers, and the softening of the glass.

The present inventors have found that if barrier layers for preventing diffusion of SiO$_2$ into the bonding glass layers are interposed between the SiO$_2$ layers and the bonding glass layers, the above-described problems encountered in the prior art can be completely overcome.

The present invention has been accomplished in view of the above-stated novel discovery.

Accordingly, an object of the present invention is to provide a high-quality magnetic head in which the mating surfaces of a pair of core halves are completely fusion bonded, and the gap portion so formed has a predetermined size and shape, and which is thus free from problems such as edge sagging, collapse, or spreading of the gap portion, and from a risk of crack formation at the gap portion.

Another object of the present invention is to provide a magnetic head which can be manufactured in a greatly enhanced yield as compared with that conventionally possible and, hence, manufactured with a high efficiency.

The above-stated objects are achieved by a magnetic head in accordance with the present invention. The gist of the present invention resides in a magnetic head having a pair of mated core halves, the mating surfaces of the core halves being bonded with a predetermined gap length provided therebetween, the magnetic head comprising a gap portion where, on each of the mating surfaces of the core halves, a non-magnetic dielectric layer of SiO$_2$ which is adjacent to the core half, a barrier layer, and a bonding glass layer are successively formed, the glass layers each associated with the corresponding core half being fusion pressure bonded together in such a manner as to form the gap portion.

According to one aspect of the present invention, each of the core halves comprises a substrate provided as one of two substrates of the core half, a magnetic-film structure body formed by magnetic films of an Fe-Si-Al alloy and interlayer films which are alternately laminated on the substrate, a glass film laminated on the thin-film structure body, and the other substrate laminated on the glass film. The barrier layer essentially consists of one substance selected from the group consisting of chromium, a mixture of chromium and chromium oxide, titanium, a mixture of titanium and titanium oxide, a chromium-titanium alloy, and a mixture of a chromium-titanium alloy and chromium-titanium alloy oxide.

DESCRIPTION OF THE PREFERRED EMBODIMENT

Descriptions will now be given in detail concerning a magnetic head in accordance with the present invention. In the following embodiment, the magnetic head is a thin-film laminated magnetic head in which magnetic films of an Fe-Si-Al alloy are employed.

Figure 3:
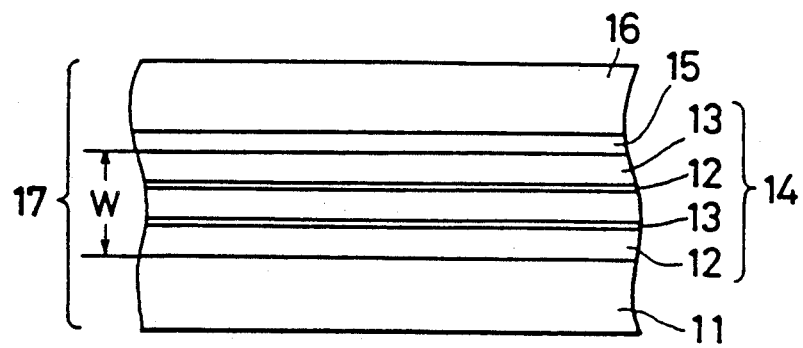
FIG. 3 is a fragmentary plan view of the magnetic head of FIG. 2, showing the layer structure of the magnetic head.
Figure 4:
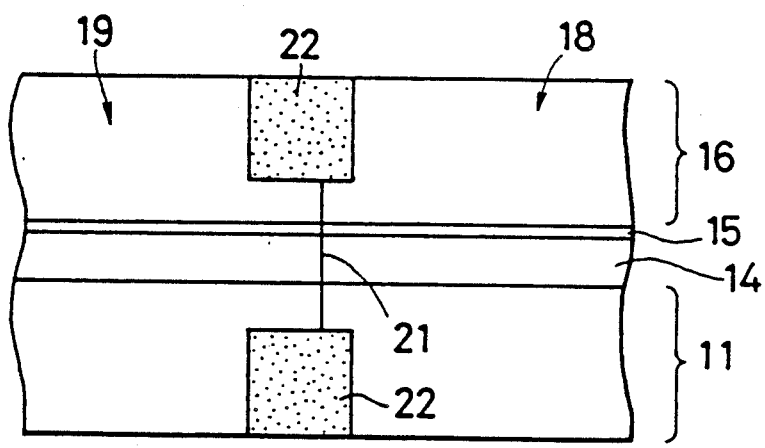
FIG. 4 is a plan view showing a gap portion of the magnetic head of FIG. 2.
Figure 5:
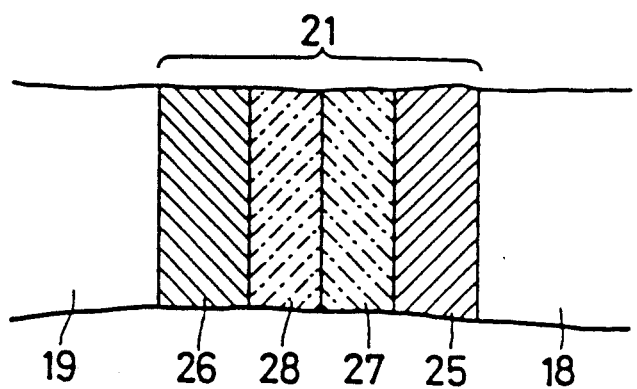
FIG. 5 is a fragmentary plan view of a gap portion of a conventional magnetic head.

A laminated film structure body 17 having the structure shown in FIG. 3 is prepared using a DC magnetron sputtering apparatus.

The laminated film structure body 17 includes a substrate 11 of crystallized glass. A film 12 of an Fi-Si-Al alloy is formed on the substrate 11 with a film thickness of 5 $\mu$m.

Subsequently, an SiO$_2$ film is formed as an interlayer film (dielectric film) 13 on the Fe-Si-Al alloy film 12, with a film thickness of 0.5 $\mu$m.

On this interlayer film 13, another magnetic film 12 and another dielectric film 13 are laminated in this order, and this laminating operation is repeated four times, thereby obtaining magnetic-film structure body 14. The entire film thickness of the resultant magnetic-film structure body 14 is 20' $\mu$m. Thereafter, the magnetic-film structure body 14 is subjected to heat treatment.

Further, a glass film 15 having a film thickness of 1 $\mu$m is formed on the magnetic-film structure body 14 by such a method as an ordinary sputtering. Subsequently, another substrate 16 formed of the same material as the substrate 11 is laminated on the glass film 15, thereby preparing the laminated film structure body 17. The resultant laminated film structure body 17 is subjected to fusion pressure bonding.

Figure 2:
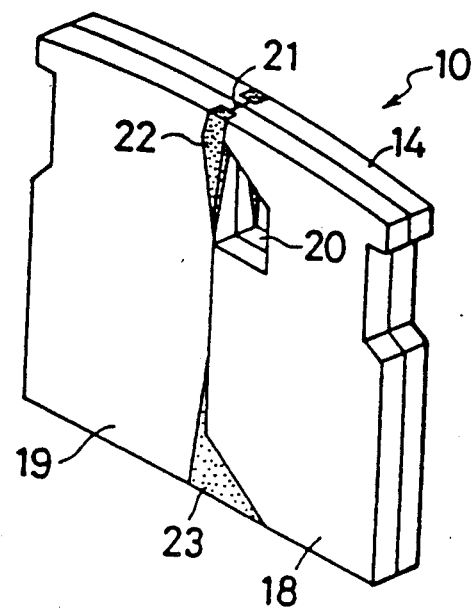
FIG. 2 is a perspective view of a thin-film laminated magnetic head to which the present invention may be applied.

Subsequently, the laminated film structure body 17 thus prepared is cut in the thicknesswise direction in which the body 17 is laminated, thereby forming a pair of core half blocks 18 and 19, as shown in FIG. 2. A coil groove 20 is formed in the core half 18. Thereafter, in order to achieve a film bonding between the mating surfaces of the core halves 18 and 19, chamfered portions 22 are formed in the two lateral side surfaces of the core half 19 opposing the coil groove 20, as shown in FIG. 2. Further, those portions of the core halves which are on the side remote from the coil groove 20 are formed with recesses 23. According to the present invention, since a gap portion 21 provides a high bonding strength, as will be described later, the formation of the chamfered portions 22 is not always necessary.

Thereafter, the mating surfaces of the core halves 18 and 19 are subjected to polishing works. Then, the gap portion 21 is formed.

Figure 1:
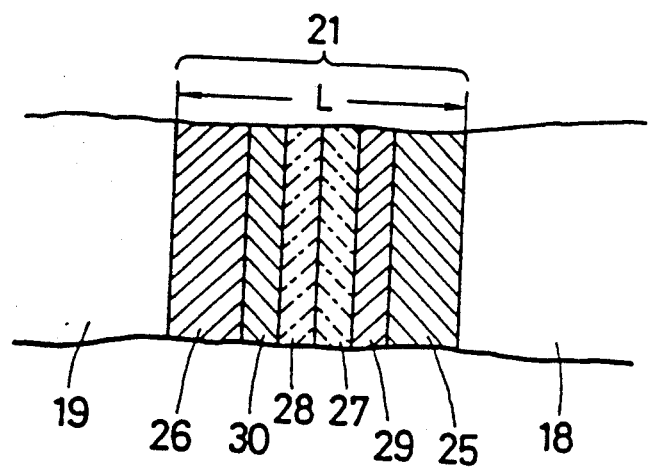
FIG. 1 is a fragmentary plan view of a gap portion of a magnetic head in accordance with the present invention.

According to the present invention, as shown in FIG. 1, on each of the polished mating surfaces of the core halves 18 and 19, a non-magnetic dielectric layer 25 or 26 formed of SiO$_2$, a barrier layer 29 or 30, and a bonding glass layer 27 or 28 are formed by sputtering.

The layer thickness of the non-magnetic dielectric layers 25 and 26 formed of SiO$_2$, that of the barrier layers 29 and 30, and that of the bonding glass layers 27 and 28 can be selected as desired so long as selected in accordance with the dimension adopted as the gap length L formed by the total thickness of the non-magnetic dielectric layers 25 and 26 of $SiO_2$, the barrier layers 29 and 30, and the bonding glass layers 27 and 28 which are associated with the corresponding core halves 18 and 19.

Each of the non-magnetic dielectric layers 25 and 26 formed of $SiO_2$ and the bonding glass layers 27 and 28 may be formed by using the same materials and the same method as those conventionally used.

Each of the barrier layers 29 and 30 may preferably be formed by sputtering a material such as chromium (Cr), a mixture of chromium and chromium oxide, titanium (Ti), a mixture of titanium and titanium oxide, a chromium-titanium alloy, or a mixture of a chromium-titanium alloy and chromium-titanium alloy oxide.

According to the result of studies and experiments conducted by the present inventors, in particular it is more preferable to have the barrier layers 29 and 30 formed of a mixture of chromium and chromium oxide, a mixture of titanium and titanium oxide, or a mixture of a chromium-titanium alloy and chromium-titanium alloy oxide, because these barrier layers are capable of enhancing the adhesion of the non-magnetic dielectric layer 25 or 26 formed of $SiO_2$ and the bonding glass layer 27 or 28 which are formed on the two sides of each barrier layer. Accordingly, when the barrier layers 29 and 30 are to be formed, it is preferable to perform sputtering using a gas mixture atmosphere obtained by mixing about 2% of oxygen gas with an atmosphere of Ar gas.

Specifically, if a chromium (Cr) target is used in combination with an atmosphere of Ar gas alone, sputtering may be performed under a pressure of $4 \times 10^{-3}$ Torr, a making electric power of 200 W, and a substrate temperature of 100° C. On the other hand, if a chromium (Cr) target is used in combination with an atmosphere of an Ar gas containing 2% of $O_2$, sputtering may be performed under a pressure of $4 \times 10^{-3}$ Torr, a making electric power of 100 W, and a substrate temperature of 200° C. In each of these cases, a film formed of chromium or a film formed of a mixture of chromium and chromium oxide may be formed as a barrier layer with a thickness within the range between 50 and 300Å.

When the gap portion 21 has been formed in this way, the core half blocks 18 and 19 have their chamfered portions 22 and the recesses 23 filled with molded glass. Also, the gap portion 21 is fusion pressure bonded by heating it at 500° to 600° C. for 30 minutes to 1 hour.

Finally, R (radius) polishing works and other forming works are performed to form the tape sliding surface, and coil winding is also performed, thereby obtaining a thinfilm laminated magnetic head 10.

In the above-described construction, the chamfered portions 22 are formed on either side of the gap portion 21, and molded glass is fused and charged into the chamfered portions 22. However, it has been found that if the gap portion 21 in accordance with the arrangement of the present invention is adopted, a sufficient bonding strength is provided even with no chamfered portions 22 formed.

Fifty magnetic heads were manufactured in the same manner as that described above. As a result, it was found that only 10 defectives occurred on account of the failure of the gap portions 21 to be fusion bonded, in other words, a yield of 80% was achieved. Thus, it has been found that, with the magnetic head of the present invention, it is possible to perform a very stable fusion bonding of the gap portion during the manufacture of the magnetic head and, hence, to form the gap portion which has a predetermined size and shape and which is free from such problems as edge sagging, collapse, or spreading. It has also been found that the following advantage is provided. With the prior art, since the degrees of the abrasion by the bonding glass which has diffused through the $SiO_2$ layers differ between the part of the gap portion corresponding to the magnetic-film structure body 14 and the part of the gap portion corresponding to the substrates 11 and 16, this difference caused variations in the gap length L. In contrast, according to the present invention, since no abrasion occurs, the gap length L remains constant.

A magnetic head having the arrangement of the present invention was manufactured as a VTR magnetic head having its film thickness direction corresponding to the width direction of the track. When the reproduction output was measured using metal tape and using a track width of 20 μm and a tape-head relative speed of 5.8 m/sec., the level of performance of the magnetic head at the reproduction output of 5 MHz was substantially the same as a magnetic head having the conventional arrangement including substrates, glass films, and molded glass.

Even when the magnetic head had been used for a long period, it was free from such problems as edge sagging, collapse or spreading of the gap portion, and no cracks were formed at the gap portion.

The magnetic head of the present invention which has the above-described arrangement allows a very stable fusion bonding of the gap portion during manufacture. Even after a long-term use, the magnetic head is free from such problems as edge sagging, collapse, and spreading of the gap portion, and from crack formation at the gap portion. Thus, according to the present invention, there is provided a high-quality magnetic head, in particular, a high-quality thin-film laminated magnetic head in which magnetic films of an Fe-Si-Al alloy are employed. Another advantage is provided in that the yield can be enhanced to a level of about 80%.

What is claimed is:

1. A magnetic head having a pair of core halves said core halves having mating surfaces, the mating surfaces of said core halves being bonded with a predetermined gap length provided therebetween, said magnetic head comprising a gap portion where, on each of the mating surfaces of said core halves, a non-magnetic dielectric layer of $SiO_2$ which is adjacent to the core half, a barrier layer which essentially consists of one substance selected from the group consisting of chromium, a mixture of chromium and chromium oxide, titanium, a mixture of titanium and titanium oxide, a chromium-titanium alloy, and a mixture of a chromium-titanium alloy and chromium-titanium alloy oxide, and a bonding glass layer are successively formed, said glass layers, each associated with the corresponding core, half being fusion pressure bonded together in such a manner as to form said gap portion.

2. A magnetic head according to claim 1, wherein each of said core halves comprises a first substrate provided as one of two substrates of the core half, a magnetic-film structure body formed by magnetic films of an Fe-Si-Al alloy and interlayer films which are alternately laminated on the first substrate, a glass film laminated on the magnetic-film structure body, and a second substrate laminated on said glass film.

3. A magnetic head having a pair of core halves, said core halves having mating surfaces, the mating surfaces of said core halves being bonded with a predetermined gap length provided therebetween, said magnetic head comprising a gap portion wherein, on each of the mating surfaces of said core halves, the following layers are successfully formed:
- (a) a non-magnetic dielectric layer of $SiO_2$, said dielectric layer being adjacent to its respective core half,
- (b) a barrier layer which prevents the diffusion of $SiO_2$ therethrough, and
- (c) a bonding glass layer, said glass layer being associated with the glass layer on the corresponding core half, and said glass layers being fusion pressure bonded together in a manner to form said gap portion.

4. A magnetic head according to claim 3 wherein said barrier layer essentially consists of one substance selected from the group consisting of: chromium, a mixture of chromium and chromium oxide, titanium, a mixture of titanium and titanium oxide, a chromium-titanium alloy, and a mixture of a chromium-titanium alloy and chromium-titanium alloy oxide.

5. A magnetic head according to claim 3, wherein each of said core halves comprises a first substrate provided as one of two substrates of the core half, a magnetic-film structure body formed by magnetic films of an Fe-Si-Al alloy and interlayer films which are alternately laminated on the first substrate, a glass film laminated on the magnetic-film structure body, and a second substrate laminated on said glass film.

6. A magnetic head according to claim 5 wherein said barrier layer essentially consists of one substance selected from the group consisting of: chromium, a mixture of chromium and chromium oxide, titanium, a mixture of titanium and titanium oxide, a chromium-titanium alloy, and a mixture of a chromium-titanium alloy and chromium-titanium alloy oxide.

* * * * *